(No Model.)

J. H. POULTER.
CHURN.

No. 594,280. Patented Nov. 23, 1897.

Witnesses.

Inventor.
John H. Poulter,
By his attorney
Arthur C. Braucher.

UNITED STATES PATENT OFFICE.

JOHN H. POULTER, OF NEWMAN, ILLINOIS, ASSIGNOR OF TWO-THIRDS TO C. M. BRADY AND JOHN S. WALKER, OF DANVILLE, ILLINOIS.

CHURN.

SPECIFICATION forming part of Letters Patent No. 594,280, dated November 23, 1897.

Application filed February 23, 1897. Serial No. 624,720. (No model.)

*To all whom it may concern:*

Be it known that I, JOHN H. POULTER, a citizen of the United States, residing at Newman, in the county of Douglas and State of Illinois, have invented a new and useful Improvement in Churns; and I do hereby declare the following to be a full, clear, and exact description of the invention, such as will enable others skilled in the art to which it appertains to make and use the same.

This invention relates to certain new and useful improvements in churns; and it consists of the construction and arrangement of the parts thereof, as hereinafter set forth and claimed.

The object of this invention is to provide a churn constructed in such a manner as to introduce currents of air into the cream through radial revolving flues secured to parallel horizontal disks, by which the air is churned and thoroughly intermingled throughout the cream, thereby promoting the rapid formation of butter.

Figure 1:
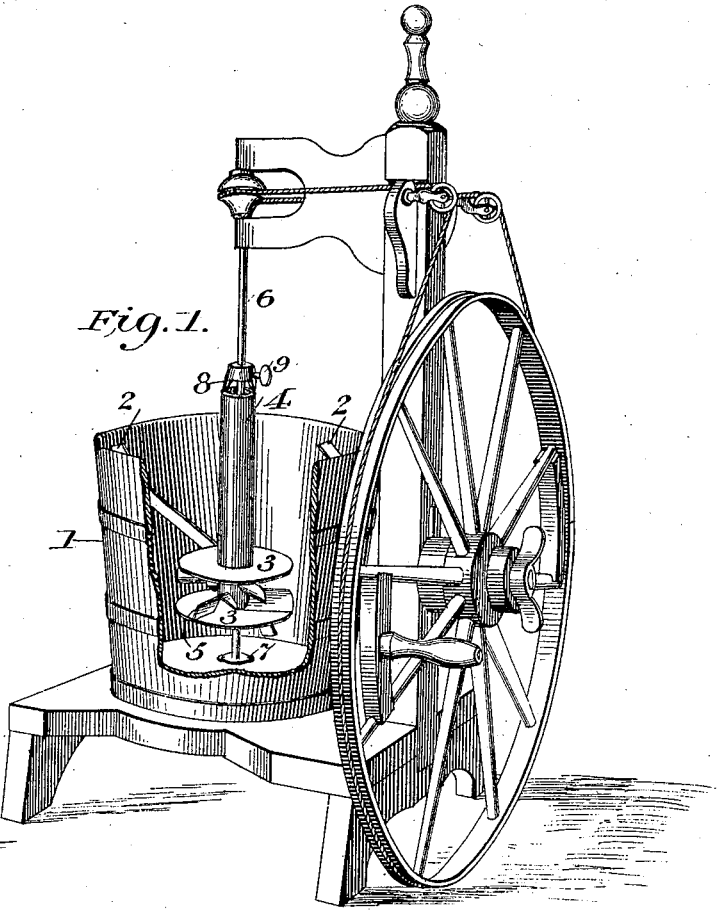
Figure 2:
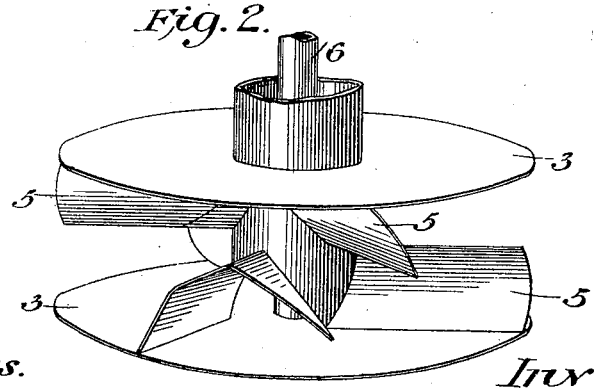

Referring to the accompanying drawings, in which similar numerals indicate like parts, Figure 1 is a perspective view of the churn embodying the invention. Fig. 2 is a detailed view of the revolving dash, showing the disks upon which are mounted the radial flues and the air-tube, with openings communicating with the radial flues.

Referring to the drawings, numeral 1 indicates the churn-body or receptacle for the cream, having upon the interior surface thereof a series of deflectors or breakers 2, for the purpose of breaking up the currents of air and cream and deflecting them downward and toward the center. These deflectors are removably secured in a downward sloping position by means of a wire engaged in a slot at the top of a churn-body and are made to conform to the interior surface of the churn-body at the top and bottom, but are curved slightly outward so as to form a passage for a portion of the cream between the deflector and the churn-body.

The revolving dash is composed of two or more parallel disks 3, mounted at the lower end of a tube 4, and between which are secured an alternating series of radially-disposed flues 5, which communicate through openings with the interior of the tube 4, permitting the passage of the air from the central tube into the body of the cream.

Extending centrally through the churn-body is a shaft 6, having suitable bearings and a driving-pulley at the upper end thereof and extending downward through the tube through an opening in the disk at the lower end of the tube and into a bearing 7 in the bottom of the churn-body.

The revolving dash is adjustably secured to the shaft by means of a collar 8 and set-screw 9 at the upper end of the tube 4, and may thus be raised or lowered to suit possible variations in the quantity of cream to be churned.

The operation of the invention is as follows: The dash, being so adjusted that the upper disk is well covered by the cream, is revolved rapidly by hand-power, as shown in Fig. 1, or other suitable power. The centrifugal force thus developed will throw the cream outwardly through the radial flues 5 and carry currents of air downward through the tube 4 to follow and become mingled with the cream. The inclined sides of the flues will drive the cream alternately upward and downward against the opposing disks, and the currents of air will be thoroughly intermingled with the cream and thrown with violence outwardly against the breakers, producing a combined churning and aerating action, which quickly causes the globules or particles to break up and separate, thus facilitating the making of butter in a marked degree.

Having thus described my invention, I claim as new, and desire to secure by Letters Patent, as follows:

1. In a churn, a revolving dash composed of double or parallel horizontal disks with radial flues alternately attached in an inclined position to the surfaces of the disks and communicating through openings with the interior of a central hollow shaft, upon which the disks are mounted, substantially as set forth.

2. In a churn, the combination of a revolving dash, composed of double or parallel horizontal disks with radial flues alternately attached in an inclined position to the surfaces of the disks, and a central hollow shaft upon which the disks are mounted with openings from the interior of the hollow shaft to the alternating radial flues, substantially as set forth.

In testimony that I claim the foregoing as my own I have hereunto affixed my signature in the presence of two witnesses.

JOHN H. POULTER.

Witnesses:
J. H. SMALLEY,
C. M. BRADY.